INVENTOR
LAWRENCE A. WESTHAVER
BY Semmes & Semmes
ATTORNEYS

A

B

C

D

INVENTOR
LAWRENCE A. WESTHAVER

BY Semmes & Semmes
ATTORNEYS

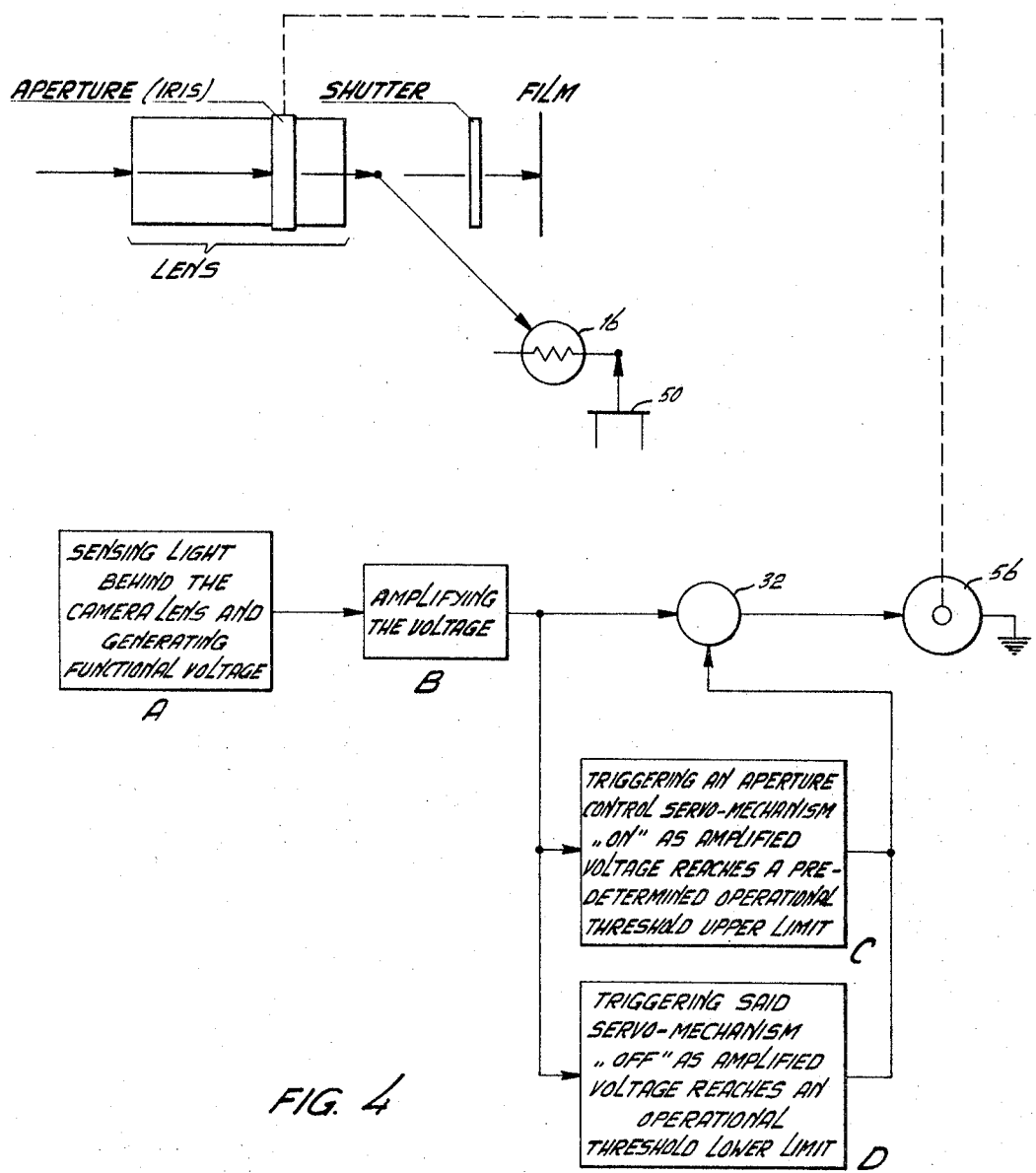

United States Patent Office 3,430,053
Patented Feb. 25, 1969

3,430,053
METHOD FOR APERTURE CONTROL IN WHICH THE LOOP GAIN IS CAUSED TO VANISH WHEN THE ABSOLUTE VALUE OF THE ERROR IS LESS THAN A GIVEN VALUE AND IS CAUSED TO ASSUME ITS NOMINAL VALUE WHEN THE ABSOLUTE VALUE OF THE ERROR IS GREATER THAN A SECOND GIVEN VALUE
Lawrence A. Westhaver, Laurel, Md., assignor of one-half to W. Tuckerman Biays, Annapolis, Md.
Filed Aug. 24, 1967, Ser. No. 663,085
U.S. Cl. 250—214  4 Claims
Int. Cl. H01j 39/12

ABSTRACT OF THE DISCLOSURE

Method for controlling the camera diaphragm or aperture to permit correct film exposure. An operational amplifier configuration is used both to sense whether the exposure error is great enough to require correction and to correct by opening or closing the aperture.

A photo resistive cell or a photo sensitive field effect transistor may be employed both to sense light level variations behind the camera lens and, with associated circuitry, to generate operational voltage as a function of sensed light. The spectral response of the photo sensitive field effect transistor extends from within the infra-red region to the ultra violet region, and, consequently, for ordinary photographic use may be limited by suitable filtering to the visible region.

BACKGROUND OF THE INVENTION

Field of the invention

Cameras, particularly any camera that requires aperture correction due to ambient light level changes or due to attenuation of exposure light as a result of optical filter changes.

Description of the prior art

G. Schrenk, 3,123,724: Iris control by D.C. motor. Exposure accuracy is limited and poor due to the shape of the photo sensor, its reaction to light outside the lens field of view, and backlash of the gears. The D.C. motor circuit operates continuously which wastes power and requires modulation and demodulation techniques.

E. Riszdorfer, 1,974,433: Controls time exposure only.

E. G. Touceder, 2,251,473: Essentially a galvanometric device wherein the current through a coil controls relatively small and fragile diaphragm elements. It uses vacuum tube circuitry which is relatively unstable.

H. Hautmann, Re. 25,925: A fragile galvanometric device, the accuracy of which is limited by friction and mechanical wear. Two blades are employed as the aperture, resulting in a poor approximation of a circle which limits the camera's performance.

N. E. Walker, 2,655,086: Uses a galvanometric movement which is part of a meter relay whose contacts are connected to a battery in such fashion as to run the aperture control motor in either direction, depending on whether the meter indicates high or low light. Meter relays fragile and neither the null area nor the speed of response are adjustable.

H. A. Gray, Jr., 2,655,848: An A.C. servo mechanism using vacuum tube circuitry and high voltages, requiring regulation of the A.C. frequency.

J. Kurshan, 2,745,021: Photometric device using point contact transistors.

J. W. Galyon, 2,206,086: A galvanometric device with various diaphragm blade shapes.

G. G. Druck, 2,683,402: A two phase A.C. servo mechanism using vacuum tube circuitry, requiring high voltages and regulated A.C. frequency.

D. A. Dotson, 2,906,187: A vacuum tube D.C. amplifier driving a meter relay; limited accuracy because of photocell-slit combination. No variations in speed of response and error tolerance. Vacuum tube circuitry is unstable and requires filament power and regulated high voltage.

SUMMARY OF THE INVENTION

The aperture controls currently available are inaccurate and in some cases, do not lend themselves to portable camera equipment. There exist mechanical inaccuracies and wearing of parts as well as variant correction speed, voltage and power requirements.

Motion picture photography beneath the sea is probably the most difficult problem encountered by the photographer. In the past, the underwater camera and exposure meter were simply enclosed in a water-tight housing with a glass port. The techniques of above water photography were not adequate to the task of recording the underwater scene. Among the problems facing the underwater cameraman were spectral imbalance, resulting in an overall blue green cast when using color film, and changing light levels that required constant metering.

Spectral imbalance can be corrected by using a series of filters that complement the water absorption curves for various light transmission distances, i.e. surface to subject to camera. The density of the filter used of course, is proportional to the light transmission distances.

The color correction red series of filters are commonly used for color correction. Each filter in the series has a published filter factor which is based on white light. The water's attenuation of the red end of the spectrum is greater than the blue. As the depth increases, the light becomes predominantly bluer, causing spectral imbalance. The use of the published factors which are based on white light will lead to under exposure. Only by actually measuring the light that passes through the filter can proper underwater exposure be determined.

In the present invention, sensing of light level is done behind the lens-filter combination and before the shutter. For any combination of ASA film rating and shutter speed setting there is a required level of light needed to correctly expose the film. Correct exposure is maintained by sensing light deviation and correcting by opening or closing the aperture to the desired degree by means of a servo mechanism. Thus, proper lens aperture setting is maintained totally independently of shutter control. That is to say, the proper lens aperture setting is maintained constantly, whether the shutter is opened or closed.

Aperture control is not limited by mechanical friction and accuracy is adjustable by the user. A threshold circuit is provided to interrupt the power to a D.C. servo motor whenever the exposure error is so small that the power supplied either could not cause correction or is photographically negligible. This prevents unnecessary power drain which is important in portable, battery operated equipment. Light sensing is done behind the lens, therefore the light sensor reacts to the same light level that exposes the film. A high degree of accuracy is maintained because the light sensor can activate the correction circuitry to compensate for mechanical errors in aperture ring and gearing.

Although the major impetus for the present development was underwater photography, the system is well adapted to conventional photography.

According to the present invention, either a photo resistor or a photo field effect transistor (photofet) is mounted behind the lens and in front of the shutter of a camera so as to receive a small percentage of total light passing through the lens. The voltage generated by the sensing circuit should be zero when the aperture is properly adjusted. Positive and negative voltage deviation indicate incorrect exposure errors. The magnitude of voltage drive is proportional to the amount of exposure error.

The output voltage of the sensing circuit is fed to the input of an inverting operational amplifier A1. The gain of the inverting operational amplifier A1 controls the accuracy to which the aperture will be set.

The amplified voltage from the operational amplifier A1 is fed through a chopper to the input of a current amplifier which drives a D.C. servo motor geared to the lens iris ring. Second and third operational amplifiers A2 and A3 are used to control the chopper. The chopper will be open, if the output voltage of the first operational amplifier is insufficient to drive the D.C. servo motor. The third operational amplifier A3 performs as a Schmitt trigger, insuring positive opening and closing of the chopper. This prevents waste of power supplied to the D.C. servo motor when the voltage from the first operational amplifier is not zero voltage but is insufficient to drive the motor. The second inverting operational amplifier A2 provides a gain of 1. Its output is the inversion of the output of the first operational amplifier. The output of the first operational amplifier and the output of the second operational amplifier are gated together, forming the input to the third operational amplifier. If gate output is zero, the aperture is correctly set. If the aperture is incorrectly set, the output of the gate will go positive, the magnitude of the voltage being proportional to the exposure error. If this voltage becomes greater than a pre-set upper triggering level, operational amplifier A3 switches the chopper "on" and permits the motor to adjust the camera iris. As the iris is adjusted, and sensed light approaches the desired level for exposure, the positive voltage from the gate falls and as it reaches the pre-set lower triggering level, operational amplifier A3 switches the chopper "off." The voltage threshold (V$t$) level and the range of hysteresis trigger effect (H) are both adjustable.

BRIEF DESCRIPTION OF THE DRAWINGS

FIG. 2A is a graphic illustration of the range of voltages sensed as a function of positive or negative light voltages at point X;

FIG. 2B is a similar graphic illustration representing the range of voltages sensed at point Y;

FIG. 2C is the voltage present at point Z as a function of positive or negative voltages from the light sensing circuit. It also shows the hysteresis range (H), which establishes the upper and lower trigger levels 80 and 82 to be centered about voltage threshold (V$t$).

FIG. 2D is a graph illustrating the voltage threshold and range of hysteresis or triggering through chopper 32.

DESCRIPTION OF THE PREFERRED EMBODIMENTS

Figure 1:
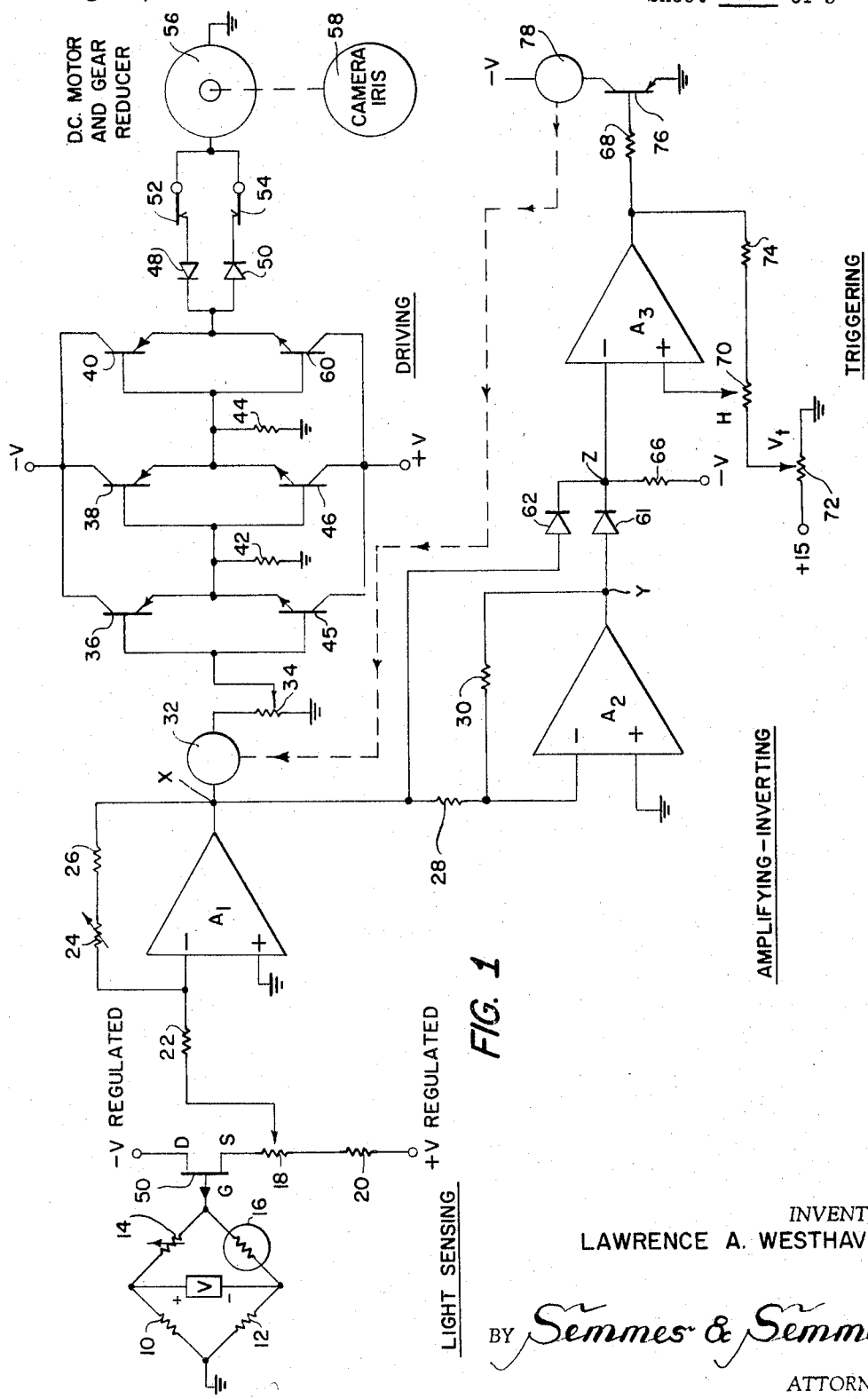
FIG. 1 is a circuit diagram, showing suggested components for light sensing adjacent a camera lens, generating voltage as a function of sensed light, and amplifying said voltage to trigger a servo mechanism opening and closing the lens aperture.

In FIG. 1 the light sensor, photo resistor 16, is one arm of a Wheatstone bridge. Resistor 10, resistor 12 and variable resistor 14 complete the bridge which is driven by battery V. The resistances of 10 and 12 are equal. Variable resistor 14 is adjusted, according to the ASA rating of the film to be used in conjunction with the shutter speed, to equal the resistance which photo resistor 16 will have when the light level for correct exposure is sensed. When the bridge is balanced, indicating correct exposure, a virtual ground or zero volts with respect to ground will be present at the gate (G) of field effect transistor 50. Any error in exposure will cause the bridge output voltage to deviate from zero (over exposure and under exposure generate negative and positive voltages respectively). The magnitude of voltage deviation is proportionate to the exposure error.

Field effect transistor 50 together with potentiometer 18 and resistor 20 form a source follower circuit which provides a high input resistance, a noninverting gain of slightly less than one and a low output resistance capable of driving the input of the succeeding inverting amplifier circuit. Thermally stable operation is assured by the proper selection of the total source load resistance, i.e. the total resistance of potentiometer 18 and resistor 20. This sets the drain (D) current at or near the zero temperature coefficient point so that gate (G) to source (S) offset voltage is stable. Potentiometer 18 is adjusted for zero volts on the wiper with an input of zero volts on the gate (G) of field effect transistor 50. This compensates for the gate (G) to source (S) offset voltage. The source follower output voltage is a function of sensed light and is, except for a slight attenuation, the same as the unloaded output voltage of the bridge.

Operational amplifiers A–1, A–2, and A–3 have differential inputs. The inverting input and the noninverting input are designated by minus and plus respectively.

Figure 2:
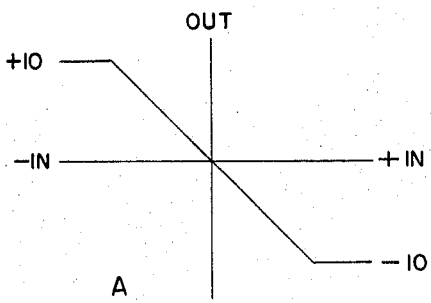
FIGS. 2A–D are illustrative examples of a voltage range for a particular amplifier, plus or minus ten volts being the positive and negative swing limits of the output. Manifestly, any voltage range may be accommodated according to the present invention.
Figure 2:
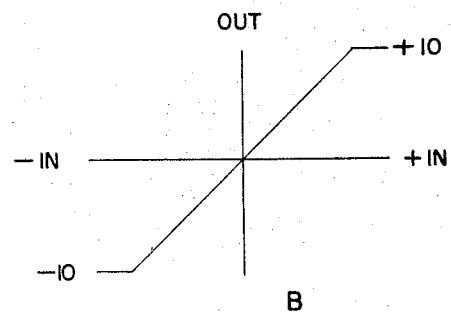
Figure 2:
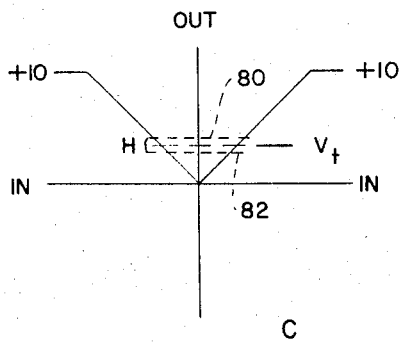

The magnitude of the gain of amplifier A–1 is determined by the feedback loop resistance (variable resistor 24 and resistor 26) divided by the input resistance (resistor 22). The output voltage at X as shown in FIG. 2A, is a function of sensed light within the swing limits and is zero volts for correct exposure.

Chopper 32, controlled by amplifier A–3, opens the input to a current amplifying circuit driving D.C. servo motor 56 whenever the output voltage of amplifier A–1 is insufficient to cause correction or is photographically negligible. Chopper 32 may be constructed conventionally. For example, chopper 32 may comprise relay contacts and chopper driver 78 may be the relay coil. Various types of choppers may be used depending upon the speed of operation desired. Field effect transistors, photo resistor-lamp combinations and the like may be employed.

The output of the chopper is applied to potentiometer 34. The maximum speed that D.C. servo motor 56 will attain is set by means of potentiometer 34, based on the maximum swing limits of amplifier A–1. If potentiometer 34 is set for less than maximum output the corresponding loss in gain may be compensated for by increasing the gain of amplifier A–1 by means of variable resistor 24. Increasing or decreasing the gain of A–1 will not affect the maximum speed setting of potentiometer 34.

The output of potentiometer 34 drives the input to a cascaded complementary emitter follower circuit comprised of complementary transistors 36–45, 38–46 and 40–60. Load resistors 42 and 44 provide thermal stabilization of the circuits. The load on the last stage is the D.C. servo motor 56 fed thru limit switches 52 and 54 and diodes 48 and 50.

Depending on factors such as available current from A–1, transistor current gain and D.C. servo motor power requirement, there may be various numbers of complementary emitter follower circuits in the cascade current amplifier.

In normal operation, switches 52 and 54 are closed, allowing servo motor 56 to be supplied with negative current to open aperture 58 or positive current to close aperture 58. Switch 54 in series with diode 50 and switch 52 in series with diode 48 are the positive and negative current paths respectively. If ambient light increases to the point where aperture 58 is at maximum closure then switch 54 opens. When the light decreases and normal operation is again possible, negative current will be supplied thru diode 48 and switch 52 opening aperture 58 to the required degree and closing switch 54. A decrease in ambient light to the point where aperture 58 is fully open will open switch 52. Thus, limit switches 52 and 54 prevent servo motor 56 from forcing aperture 58 beyond its normal limits.

Z designates the output of a gate comprised of diodes 61 and 62 and resistance 66 intermediate unity gain inverting amplifier A2 and operational or triggering amplifier A3. Unity gain of amplifier A2 is established by resistors 28 and 30 being equal. Whenever there is no exposure error, the outputs of amplifiers A2 and A1 are zero. If X is positive and Y is neagtive or vice versa, gate Z will choose the positive function so as to present a positive voltage to operational amplifier A3, operating as a Schmitt trigger. The positive voltage present at Z is proportionate to the degree of exposure error, regardless of whether it is over exposure or under exposure. The hysteresis effect (H), having upper and lower switching points 80 and 82, as illustratedt in FIG. 2C and as set by potentiometer 70, may encompass any given voltage range, for example, from 2.5 to 3.1 volts. The operational voltage threshold (Vt) may be adjustably set by potentiometer 72 at 2.8. Potentiometer 72 should be low enough in resistance so that Vt is not altered appreciably when A3 switches. As sensed light results in voltage equal to or greater than the upper switching point 80, the Schmitt trigger A3 closes chopper 32 through chopper drive transistor 76. As chopper 32 is closed, D.C. servo motor 56 is activated, driving the aperture and reducing the exposure error. When the voltage error at Z becomes equal to or less than the lower switching level 82, A3 triggers chopper 32 open de-activating D.C. motor 56. As a result, there is precise opening and closing of the camera aperture within the desired error range. Also, there is a total absence of power drain in the driving circuit except when actually correcting within the preselected voltage range. Supply voltages for light sensing amplifying and triggering components may be stabilized conventionally.

Figure 3:
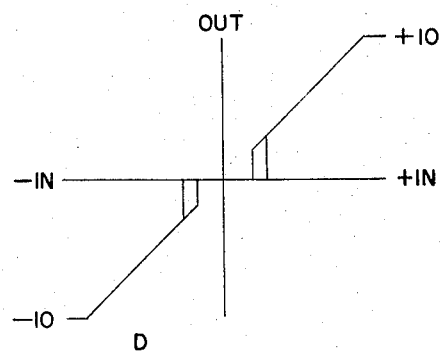
FIG. 3 is another light sensing circuit, suggested for use when fast electronic response or wide spectral response are important factors.
Figure 3:
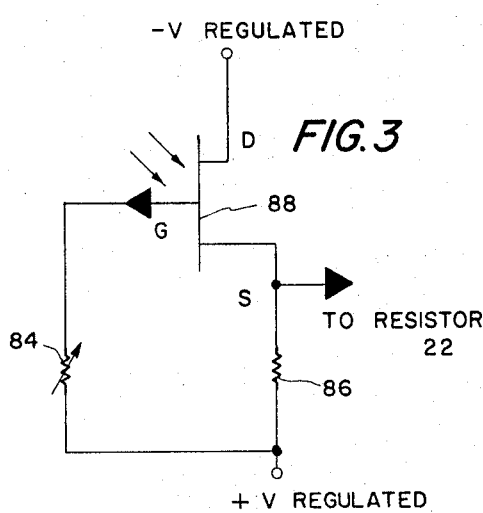

FIG. 3 illustrates a suggested light sensing circuit suitable for use when speed of response and wide spectrum of response are critical factors. According to this modification, the bridge illustrated in FIG. 1, as well as field effect transistor 50, potentiometer 18 and resistance 20 are eliminated. In the FIG. 3 modification photo field effect transistor (photofet) 88 and resistance 86 form a source follower configuration. In the absence of light the voltage at source (S) of photofet 88 will be positive with respect to ground. The light level necessary for correct exposure will cause a drain to gate (G) leakage current in photofet 88. This current applied through gate potentiometer 84 will cause a voltage drop, increasing the current through resistance 86. Potentiometer 84 is set so that the correct light level (determined by ASA rating and shutter speed) will increase the current through resistance 86 and provide zero volts at (S). As set forth above, increasing or decreasing light level correspondingly will cause (S) to go positive or negative.

Manifestly, various types of sensing devices, triggering devices, amplifiers and complementary emitter follower configurations may be employed without departing from the spirit and scope of the invention as defined in the claims.

I claim:
1. Method for aperture control in a camera of the type including lens and aperture with a servo-mechanism for opening and closing the aperture:
 (A) sensing the amount of light behind the camera lens and generating voltage as a function of sensed light;
 (B) amplifying said voltage;
 (C) triggering said servo-mechanism "on" as amplified voltage reaches a pre-determined operational threshold, upper limit defined in a positive voltage range; and
 (D) triggering said servo-mechanism "off" as amplified voltage reaches an operational threshold lower limit.
2. Method for aperture control in a camera of the type including lens and aperture with a servo-mechanism for opening and closing the aperture:
 (A) sensing the amount of light behind the camera lens lens and generating voltage as a function of sensed light;
 (B) inverting said voltage;
 (C) amplifying said voltage;
 (D) triggering said servo-mechanism "on" as amplified voltage reaches a pre-determined operational threshold, upper limit defined in a positive voltage range; and
 (E) triggering said servo-mechanism "off" as amplified voltage reaches an operational threshold lower limit.
3. Method as in claim 2, including:
 (F) limiting triggering of said servo-mechanism to the f stop range of said aperture by switching said servo driving mechanism "off" and "on," respectively, as the highest and lowest f stops are reached.
4. Method as in claim 3, including limiting operation of said servo-mechanism except upon triggering on.

References Cited
UNITED STATES PATENTS

| | | | |
|---|---|---|---|
| 2,722,640 | 11/1955 | Merrill et al. | 318—29 |
| 2,906,187 | 9/1959 | Dotson et al. | 95—10 X |
| 2,994,834 | 8/1961 | Jones | 330—13 |
| 3,051,840 | 8/1962 | Davis | 250—211 |
| 3,058,700 | 10/1962 | Hecht | 318—29 |
| 3,143,054 | 8/1964 | Ploke et al. | 95—10 X |
| 3,230,847 | 1/1966 | Gregory et al. | 95—10 X |
| 3,345,536 | 10/1967 | Atkins et al. | 250—214 X |

RALPH G. NILSON, *Primary Examiner.*

T. N. GRIGSBY, *Assistant Examiner.*

U.S. Cl. X.R.

95—10; 250—211, 229; 318—29; 330—13